United States Patent Office 3,445,358
Patented May 20, 1969

3,445,358
RADIATION POLYMERISATION PROCESS OF TRIOXANE AND A ISOCYANATE STABILIZER
Henri Sack, deceased, late of Verneuil-en-Halatte, France, by Berthe Sack, administratrix, Verneuil-en-Halatte, France, assignor to Houilleres du Bassin du Nord & du Pas-de-Calais, Douai, Nord, France
No Drawing. Filed Dec. 21, 1964, Ser. No. 420,209
Claims priority, application France, Dec. 20, 1963, 957,872
Int. Cl. C08g 1/04, 51/64; B01j 1/10
U.S. Cl. 204—159.21                              1 Claim

ABSTRACT OF THE DISCLOSURE

From 0.1 to 5.0 percent by weight of an organic isocyanate, diisocyanate or polyisocyanate is dissolved in molten trioxan and the mixture is then quickly cooled as by pouring it into a non-solvent for either component. The resulting mixture is then subjected to ionizing radiation and then polymerized in a separate vessel under heat treatment. The resulting polyoxymethylene is stable against thermal degradation.

---

This invention relates to the radiation-induced polymerisation of trioxan.

One method for improving the stability of polyoxymethylenes has been to incorporate stabilisers such as antioxidants, for example, amines, phenols or polyaminoamides, into the trioxan before it is polymerised to the polyoxymethylene.

Unfortunately, the stabilisers do not, in general, become evenly distributed throughout the final polymer. Consequently, the polymer is not as stable as it should be since, while some parts of it contain sufficient stabiliser to ensure good stability, others are inadequately protected against degradation due to shortage of stabiliser, even though the total amount of stabiliser present is sufficient to ensure adequate stability if it was evenly distributed throughout the polymer.

Accordingly, it is an object of this invention to provide a stabilised polyoxymethylene wherein the polymer is uniformly protected against degradation.

According to the present invention, we provide a process for the production of polyoxymethylene by the radiation-induced polymerisation of trioxan, in which from 0.1 to 5.0% of at least one compound which is soluble to the extent of at least 0.5% in liquid trioxan at 65° C. and which combines with hydroxyl groups at this temperature, but is free of acidic functions, is introduced into the trioxan before it is irradiated.

The preferred additives of this type are organic isocyanates, diisocyanates and polyisocyanates and the preferred method for introducing the additives into the trioxan is to dissolve them in molten trioxan and then to pour this solution into a liquid non-solvent for both the trioxan and the additive. Upon contact with the liquid, the trioxan/additive mixture solidifies practically instantaneously and the additive has no chance to separate from the trioxan.

The effect of the sudden quenching of the trioxan/additive mixture is to "freeze" the additive in position in the trioxan and not to allow any possibility of pockets of additive building up. According to theory, crystallisation is accompanied by a self-purification effect in which the major component of a mixture crystallises out initially with practically no foreign inclusions. Thus, if a molten mixture of trioxan and an additive is slowly cooled and crystallised, the first portions of trioxan crystallising out are practically free from additive whereas subsequent portions crystallise with increasing additive concentrations.

On the other hand, if the mixture of trioxan and additive is quenched in a liquid non-solvent as described above, the mixture is instantly solidified without the self-purification process taking place.

The non-solvent liquid in which the molten trioxan/additive solution is quenched is preferably a hydrocarbon having from 7 to 12 carbon atoms, preferred members of this class being mixtures of hydrogenation-refined linear and branched decanes and undecanes containing about 30 p.p.m. of water.

If the maximum limit of additive (5%) is exceeded, the excessive quantity of non-isomorphous inclusion in the trioxan has an adverse effect on the polymerisation.

Irradiation and polymerisation of the trioxan are suitably carried out as described in the French patent specification No. 1,292,224. However, it may be desirable to use a greater amount of radiation because of the presence of the additives. This increase in the radiation dose does not, in general, have an adverse effect on the quality of the polymer.

In order that the invention may be more fully understood, the following examples are given by way of illustration only. In these examples, as throughout the specification, all proportions, ratios and percentages are on a weight basis, unless stated to the contrary.

EXAMPLE 1

0.7% of naphthylene diisocyanate was added to molten trioxan at a temperature of 65° C. and the resulting solution was poured into n-decane with agitation.

The resultant suspension of trioxan/naphthylene diisocyanate in n-decane was heated to 50° C. and transferred to a container situated beneath a 0.150 m.e.v. X-ray beam where it was irradiated at this temperature. The average period of retention of the suspension beneath the beam was about 7 minutes and the irradiation dose was 35,000 rad.

During this irradiation practically no polymerisation occurred, but it did begin when the suspension was transferred to another container also kept at a temperature of 50° C. in which the suspension was subjected to a slight agitation to prevent any caking as a result of sedimentation.

After 40 hours in this second container, the suspension was heated to 70° C. and, whilst at this temperature, the unpolymerised trioxan and the n-decane were removed by centrifugation of the mixture and the polymer was then washed with a large amount of hot toluene.

25% of a modified polymer was obtained and, unlike the spectrum of a non-modified polymer, the spectrum of the modified polymer had a marked absorption band shoulder at 3.10 microns and a very marked absorption band at 4.45 microns; the appearance of the spectrum between 5.6 and 6.8 microns is also different from that of a polyoxymethylene containing no additive. Furthermore, another shoulder was found at 7.65 microns and a marked absorption at 12.9 microns. The polymer was stable and its decomposition at 160° C. was less than 1% per hour.

EXAMPLE 2

0.5% of naphthylisocyanate was dissolved in molten trioxan and the solution kept at boiling point for half an hour. This solution was then poured in a thin layer onto a cold plate to solidify it very rapidly.

This plate was irradiated with a cobalt-60 source to give a mean irradiation of 60,000 rad at ambient temperature, at an intensity of 2,000 rad/hour.

The irradiated plates were then placed in a container, which was evacuated by means of a vacuum pump and then filled with $CO_2$ to give a pressure in the container of about 500 g. per square cm. above atmospheric. The plates were left in this container for 48 hours at 52° C. to polymerise the trioxan and produce a polymer of excellent quality in a 38% yield.

The same process was carried out on a trioxan without the addition of any additive and a comparison of the two polymers is given below.

Yield.—Without additive the yield is 55%, i.e. distinctly greater than that obtained with additives, but the unmodified polymers are of an inferior quality and their molecular weights are spread over a wider range.

Reduced viscosity.—In aniline at 135° C. at a concentration of 0.5% with the additive it is 4.0 although the product was not completely soluble at this temperature. Without the additive, the reduced viscosity is 2.7.

Infra-red spectrum of the products reprecipitated in aniline and washed with acetone.—In the case of the modified polymer the spectrum showed the presence of numerous phenyl and amine groups as compared with the spectrum of the product without the additive.

Solubility in a 2 N solution of sodium sulphite.—The amount of polymer which dissolved over a period of 24 hours at 20° C. was 5% in the case of the modified polymer and 16% in the case of the unmodified polymer.

Stability to acylating agents.—After one hour's reflux with butyric anhydride the amount of polymer remaining was 97% in the case of the isocyanate-modified polymer, while it was only 89% in the case of the unmodified polyoxymethylene. The difference between these values and 100% represents the percentage of polymer decomposed by the acylation treatment.

Decomposition of polymers after 5 hours in air at 160° C.—This is 3% for the modified polymer and 16% for the unmodified one.

K 222 (as defined in French patent specification No. 1,131,939).—For polymers acylated for one hour by refluxing with butyric anhydride was 0.06% per hour after 5 hours for the isocyanate modified polymer and 0.9% per hour after 5 hours for the unmodified one.

EXAMPLE 3

Trioxan containing the following impurities:

| | P.p.m. |
|---|---|
| Water | 150 |
| Formic acid | 120 |
| Formaldehyde | 200 |
| Dioxalane | 5 |
| Methanol | 20 |
| Tetroxane | 200 |
| Methyl formiate | 12 | was melted under nitrogen at 65° C. and 1% by weight of tolylene diisocyanate was added thereto. The mixture, contained in a polyethylene bag, was then solidified by cooling between two copper plates spaced 1 cm. apart, the plates being cooled with water at 25° C. The block of trioxan/additive mixture was irradiated under nitrogen with gamma radiation to give an irradiation dose of 200,000 rad from a cobalt-60 source at an intensity of 13,000 rad/hour. Polymerisation was then effected by maintaining the irradiated block at 53° C. for 24 hours under nitrogen. After extracting the unreacted monomer and excess additive with boiling toluene, the polymer was dried in a vacuum oven. Yield 27%. Reduced viscosity in aniline at 135° C. (concentration 0.5%) was 1.90. The spectrum of the polymer showed, with respect to a polymer produced from the same trioxan under the same conditions, but without the additive, a strong isocyanate band of 4.45 microns, a band at 13.2 microns and a carbonyl absorption band 15 times as strong as that of the unmodified polymer. At 160° C. in the presnce of air the polymer lost 4% of its initial weight (in comparison with 20% for the unmodified polymer).

EXAMPLE 4

Under conditions similar to those of Example 3, 3% of diphenylmethane diisocyanate was dissolved in an identical molten trioxan. Irradiation and polymerisation were effected under the same conditions as in Example 3 to give 37% of polymer having a reduced viscosity of 1.6. The spectrum of this polymer showed strong isocyanate bands and the carbonyl bands were 5 times as strong as those of the unmodified polymer. A substantial modification of the spectrum between 6 and 6.5 microns was also noted. The weight loss of the polymer at 160° C. in the presence of air was 6% during the first 5 hours.

EXAMPLE 5

In place of the diphenylmethane diisocyanate of Example 4 which was dissolved in the trioxan with a certain difficulty, 1% of a 50% solution of this compound in xylene was used. The additive dissolved in the trioxan instantaneously. Polymerisation was effected as in Example 3 to give a polymer yield of 33%. The polymer had a reduced viscosity of 1.5. The spectrum was little different from that of the product obtained in the preceding example, with a substantial band at 4.5 microns, a carbonyl band 3 times that of the unmodified product, and with the region between 6 and 6.5 microns substantially resembling that of the unmodified polymer.

What I claim is:

1. The process for the production of polyoxymethylene which consists essentially of the steps of dissolving as sole stabilizer from about 0.1% to 5.0% by weight of at least one compound selected from the group consisting of organic isocyanates, diisocyanates and polyisocyanates in molten trioxane, rapidly quenching said solution to solidify it, subjecting said solidified solution to ionizing irradiation, transferring the resulting irradiated solid solution to a radiation-free zone and there polymerising said irradiated material into stabilized polyoxymethylene.

References Cited

UNITED STATES PATENTS

| 3,313,752 | 4/1967 | Sack | 204—159.21 |
| 2,296,249 | 9/1942 | Austin et al. | 260—67 |

FOREIGN PATENTS

| 1,221,148 | 1/1960 | France. |
| 1,259,321 | 2/1961 | France. |
| 1,292,224 | 3/1962 | France. |
| 1,384,348 | 11/1964 | France. |

OTHER REFERENCES

Okamura et al., Post Irradiation Polymerization of Trioxane, Annual Report of the Japanese Association for Radiation Chemistry, vol. 3, December 1962, pp. 299–310.

SAMUEL H. BLECH, *Primary Examiner.*

R. B. TURER, *Assistant Examiner.*

U.S. Cl. X.R.

260—67